US009323479B2

(12) United States Patent
Sato (10) Patent No.: US 9,323,479 B2
(45) Date of Patent: Apr. 26, 2016

(54) INFORMATION PROCESSING APPARATUS FOR DISPLAYING THUMBNAIL IMAGES ASSOCIATED WITH PRINTED FRAMES OF A MOVING IMAGE FILE

(71) Applicant: BROTHER KOGYO KABUSHIKI KAISHA, Nagoya-shi, Aichi-ken (JP)

(72) Inventor: Hirokazu Sato, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/631,247

(22) Filed: Feb. 25, 2015

(65) Prior Publication Data
US 2015/0242728 A1  Aug. 27, 2015

(30) Foreign Application Priority Data
Feb. 27, 2014  (JP) .................... 2014-037391

(51) Int. Cl.
*G06K 15/00* (2006.01)
*G06F 3/12* (2006.01)

(52) U.S. Cl.
CPC ........................ *G06F 3/12* (2013.01)

(58) Field of Classification Search
CPC ............ G06F 17/30843; G06K 9/00711; G06K 9/00744; G06K 9/00751
See application file for complete search history.

(56) References Cited

U.S. PATENT DOCUMENTS

| 8,196,045 | B2* | 6/2012 | Chandratillake | G06F 17/30817 715/719 |
| 2004/0268223 | A1* | 12/2004 | Tojo | G06F 17/30843 715/255 |
| 2007/0237225 | A1* | 10/2007 | Luo | G06F 17/30811 375/240.12 |
| 2009/0307626 | A1* | 12/2009 | Jalon | G06F 3/0481 715/771 |
| 2013/0027365 | A1* | 1/2013 | Sugimoto | H04N 1/00474 345/204 |

FOREIGN PATENT DOCUMENTS

JP  2007-266659 A  10/2007

* cited by examiner

*Primary Examiner* — Benjamin O Dulaney
(74) *Attorney, Agent, or Firm* — Merchant & Gould P.C.

(57) ABSTRACT

A medium stores instructions that are executable by a computer. The instructions cause a controller of an information processing apparatus to receive a selection of a moving-image file from a plurality of moving-image files stored in a storage unit, to receive a selection of a print target frame image from a plurality of frame images composing the moving-file that has been selected, to output print data based on the print target frame image to a print unit, to store a thumbnail composing image based on the print target frame image upon associating with the moving-image file that has been selected, and to display one thumbnail image based on the thumbnail composing image that has been stored in the storage unit upon associating with that moving-image file, for each of the plurality of moving-image files that has been stored in the storage unit.

20 Claims, 9 Drawing Sheets

FIRST EMBODIMENT
(PROCESSING IN TERMINAL)

THUMBNAIL DISPLAY PROCESSING

S421 — HAS PLURALITY OF THUMBNAIL COMPOSING IMAGES BEEN STORED?

YES → S423 DISPLAY THUMBNAIL IMAGE WHICH INCLUDES PLURALITY OF THUMBNAIL COMPOSING IMAGES

NO → S422 DISPLAY THUMBNAIL IMAGE WHICH INCLUDES ONE THUMBNAIL COMPOSING IMAGE

END

Fig. 5C

SECOND EMBODIMENT
(PROCESSING IN TERMINAL)

THUMBNAIL DISPLAY PROCESSING

S521 — DISPLAY N NUMBER OF THUMBNAIL COMPOSING IMAGES WHILE SWITCHING TO ANOTHER THUMBNAIL IMAGE AT CONSTANT TIME INTERVAL

END

INFORMATION PROCESSING APPARATUS FOR DISPLAYING THUMBNAIL IMAGES ASSOCIATED WITH PRINTED FRAMES OF A MOVING IMAGE FILE

CROSS REFERENCE TO RELATED APPLICATION

The present application claims priority from Japanese Patent Application No. 2014-037391 filed on Feb. 27, 2014, the disclosure of which is incorporated herein by reference in its entirety.

BACKGROUND

1. Field of the Invention

The present invention relates to a non-transitory computer-readable medium storing instructions for information processing apparatus, an information processing apparatus, and an information processing method.

2. Description of the Related Art

In a technology described in Japanese Patent Application Laid-open No. 2007-266659, a list of thumbnails corresponding to still images and/or thumbnails corresponding to moving images is displayed on a display unit. Moreover, in a case that any of the thumbnails in the list displayed on the display unit has been selected, a still image or a moving image corresponding to the thumbnail that has been selected, is displayed.

SUMMARY

According to the technology described in Japanese Patent Application Laid-open No. 2007-266659, a thumbnail corresponding to the moving image is generated (created) from an image of any one frame in that moving image, for example. Therefore, it is difficult for a user to associate the thumbnail corresponding to one frame of the moving image with a content of the moving image corresponding to that thumbnail. Consequently, there is a possibility that the user is not able to select easily a desired moving image from a large number of moving images.

The present invention has been made in view of the above-mentioned circumstances, and an object of the present invention is to provide a technology for displaying a thumbnail image which enables the user to select a desired moving-image file easily.

According to the present invention, there is provided a non-transitory computer-readable medium storing computer-executable instructions that, when executed by a processor, cause a controller of an information processing apparatus provided with a display unit and the controller, and connected with a storage unit and a print unit, to perform: receiving a selection of a moving-image file from a plurality of moving-image files which has been stored in the storage unit; receiving a selection of a print target frame image from a plurality of frame images composing the moving-image file that has been selected; outputting print data of the print target frame image to the print unit; storing a thumbnail composing image in the storage unit upon associating with the moving-image file that has been selected, the thumbnail composing image being one of the print target frame image, a reduced image of the print target frame image, and an enlarged image of the print target frame image; and displaying, on the display unit, one thumbnail image based on the thumbnail composing image that has been associated with the moving-image file and stored in the storage unit, for each of the plurality of moving-image files that has been stored in the storage unit.

It is possible to arrange the present invention in various aspects such as an information processing apparatus, a control unit controlling the information processing apparatus, an information processing system, an information processing method, and a medium storing information processing computer program.

DETAILED DESCRIPTION OF THE PREFERRED EMBODIMENTS

Preferred embodiments of the present invention will be described below by referring to the accompanying diagrams. Firstly, a first embodiment of the present invention will be described below by referring to diagrams from FIG. 1 to FIG. 4B.

Figure 1:
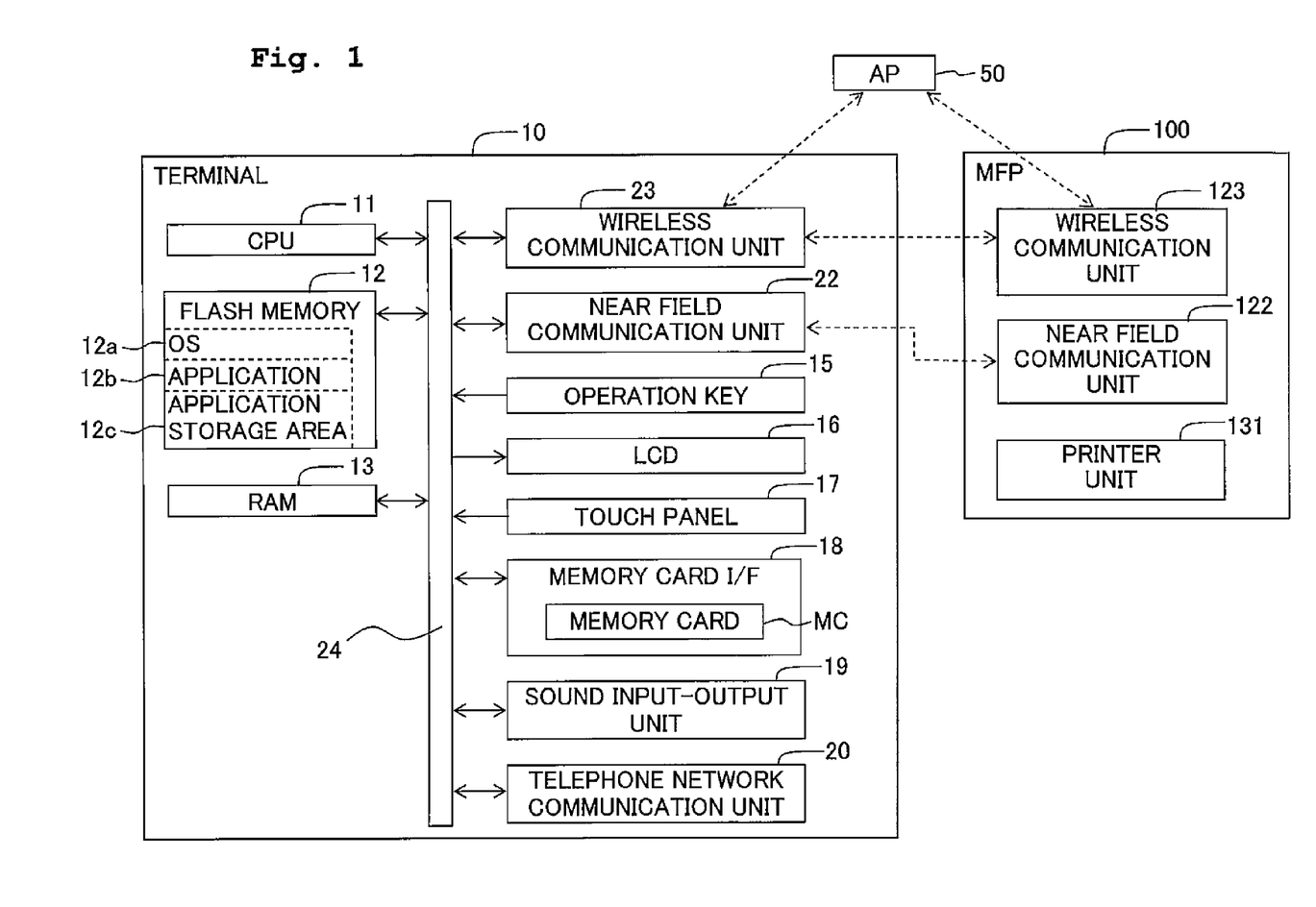
FIG. 1 is a block diagram showing an electrical configuration of a terminal.

The terminal 10 according to the present embodiment is arranged as a portable terminal such as a smart phone. The terminal 10 is provided with a CPU (central processing unit) 11, a flash memory 12, a RAM (random access memory) 13, an operation key 15, an LCD (liquid-crystal display) 16, a touch panel 17, a memory card interface (hereinafter, referred to as "memory card I/F") 18, a sound input-output unit 19, a telephone network communication unit 20, a near-field communication unit 22, and a wireless communication unit 23. All these devices and function units are connected mutually via a bus line 24.

The CPU 11 controls each of the devices and function units connected to the bus line 24 according to a computer program and fixed values stored in the flash memory 12. The flash memory 12 is a rewritable non-volatile memory. An operating system 12a (hereinafter referred to as "OS 12a") and an application program 12b (hereinafter referred to as "application 12b") are stored in the flash memory 12. Moreover, in the following description, the CPU 11 which executes a computer program such as the OS 12a and the application 12b is sometimes mentioned only by a name of a computer program. For instance, when it is mentioned as "application 12b", it means "the CPU 11 which executes the application 12b". The OS 12a is the basic software for realizing standard functions of the terminal 10. In the present embodiment, the OS 12a is an Android (registered trademark) OS.

The application 12b is an application program that is provided by a vendor of various devices connectable to the terminal 10. A user, by installing the application 12b in the terminal 10, is capable of using various functions of a device corresponding to the application 12b via the terminal 10. For instance, the user can use functions such as a print function and a scan function of a device corresponding to the application 12b by using the terminal 10, and without using a personal computer (hereinafter, referred to as "PC").

In a case that the user has selected one moving image as a print target, the application 12b is programmed such that the user can print one frame image included in a plurality of frame images forming a moving-image file that has been selected for print by the user. The print of the frame image is sometimes referred to as "moving-image print". In the present embodiment, on a selection screen for selecting a moving-image file of a print target (hereinafter referred to as "file selection screen"), a thumbnail image corresponding to each moving-image file is displayed. For a moving-image file which has been subjected to moving-image print in the past, a thumbnail image which includes a frame image that was printed is displayed. Accordingly, the user is capable of selecting easily a print target moving-image file from a plurality of moving image files. Each processing shown in a flowchart in FIGS. 3A and 3B, and a flowchart in FIGS. 4A and 4B, which will be described later, is a processing to be executed by the CPU 11 according to the application 12b.

Moreover, a storage area for application (hereinafter referred to as "application storage area") 12c is provided in the flash memory 12. The application storage area 12c is a storage area allocated to the application 12b, to be used by the application 12b. A thumbnail composing image which is to be created from a frame image that has been printed, and to be displayed as a thumbnail image, is stored in the application storage area 12c.

The RAM 13 is a rewritable not-volatile memory, and has a temporary area for storing various data temporarily, for the CPU 11 to execute the application 12b for example. The operation key 15 is a mechanical key for inputting instructions etc. to the terminal 10. The operation key 15 is provided to a casing of the terminal 10 for example. The LCD 16 is a liquid-crystal display unit which displays various screens. The touch panel 17 is provided to overlap the LCD 16. The user, by touching or by bringing an instruction object such as a rod or a finger closer to the touch panel 17, can input an instruction etc. to the terminal 10. The memory card I/F 18 is an interface in which a rewritable not-volatile memory card MC is to be installed. The memory card I/F 18 controls writing or reading data in or from the memory card MC. The sound input-output unit 19 is a device for inputting or outputting sound, including a mike and a speaker etc. The telephone network communication unit 20 is a circuit for carrying out conversation via a mobile telephone network (not shown in the diagram).

The near-field communication unit 22 is an interface for a close distance wireless communication. A distance communicable in the close distance wireless communication is a short distance of about 10 cm for example. The near-field communication by the near-field communication unit 22 according to the present embodiment is a non-contact communication in accordance with NFC standards (hereinafter, referred to as "NFC communication"). In other words, in the present embodiment, the terminal 10 is capable of carrying out NFC communication with a multifunction peripheral (hereinafter referred to as "MFP") 100 having a near-field communication unit 122.

The wireless communication unit 23 is an interface for communication in accordance with wireless LAN standards (wireless LAN communication). In the present embodiment, the wireless communication unit 23 carries out wireless LAN communication conforming to IEEE802.11b/g/n standards. The terminal 10 is capable of carrying out wireless communication in accordance with Wi-Fi (registered trademark) standards (hereinafter referred to as "Wi-Fi communication") with an access point (hereinafter referred to as "AP") 50 via the wireless communication unit 23. Moreover, the terminal is capable of carrying out direct communication with the MFP 100 according to Wi-Fi Direct (registered trademark), or in other words, wireless communication without going through the AP 50.

The AP 50 is a relay device (an intermediary device) for relaying Wi-Fi communication. The terminal 10 is capable of carrying out Wi-Fi communication with the MFP 100 having the wireless communication unit 123. The AP 50 has a broadband rooter function, and can be connected to the Internet (not shown in the diagram). Accordingly, the terminal 10 can be connected to the Internet via the AP 50.

The MFP 100 has various functions such as a print function, a scan function, a copy function, and a facsimile function. The MFP 100 includes units such as a printer unit 131, a scanner unit (not shown in the diagram), and a facsimile communication unit (not shown in the diagram) for realizing various functions. The MFP 100 includes the near-field communication unit 122 similar to the near-field communication unit 22. Moreover, the MFP 100 includes the wireless communication unit 123 similar to the wireless communication unit 23.

Figure 2A:
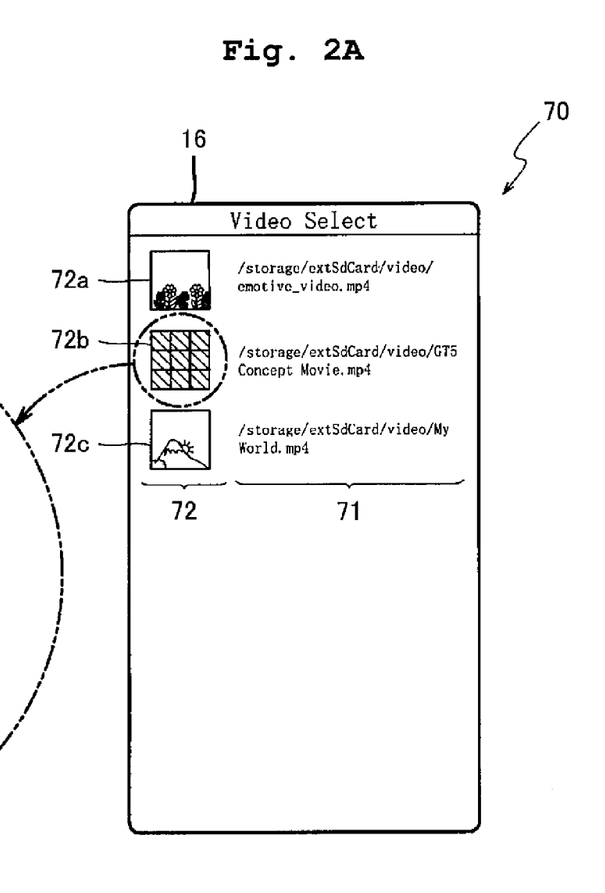
FIG. 2A is a diagram showing an example of a file selection screen.

FIG. 2A is a diagram showing schematically an example of the file selection screen 70 which is displayed on the LCD 16 of the terminal 10 by the application 12b. In a menu screen (not shown in the diagram) displayed by the application 12b, in a case that the user has selected a "moving-image print" menu, the file selection screen 70 is displayed. A pass 71 which indicates where the moving-image file is to be stored and a thumbnail image 72 corresponding to the moving-image file specified by the pass 71 are displayed on the file selection screen 70. The number of sets of the pass 71 and the thumbnail image 72 is same as the number of moving-image files that can be printed. In the present embodiment, the moving-image files that can be printed have been stored in the memory card MC. However, the moving-image files that can be printed may be stored in an internal memory such as the flash memory 12.

The application 12b according to the present embodiment displays a thumbnail composing image created from a frame image that was printed in the past, as the thumbnail image 72. With respect to a moving-image file that was printed only once in the past, or a moving-image file that was not printed in the past, the thumbnail image 72 (such as a thumbnail images 72a and 72c) which includes content of only one frame image is displayed.

Whereas, with respect to a moving-image file for which a plurality of frame images were printed in the past, thumbnail images 72 (such as the thumbnail image 72b) which includes contents of at most N number of frame images are displayed. Here, N is an integer not smaller than 2. In the present embodiment, N=9. Content of the thumbnail image 72 displayed on the file selection screen 70 in FIG. 2A is omitted and replaced by hatching.

Figure 2B:
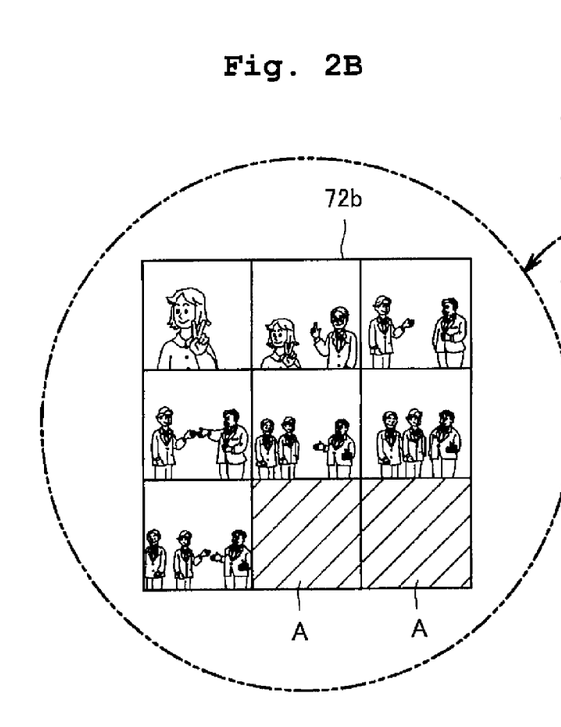
FIG. 2B is an enlarged view of a thumbnail image.

In the present embodiment, the thumbnail 72b includes contents of at the most nine frame images, and the contents of these frame images are arranged in the form of tiles arranged in 3×3. In a case that the number of frame images printed in the past is smaller than N, as shown in FIG. 2B, the contents of all the frame images printed in the past are arranged in the form of tiles, and areas A in which the contents of frame images have not been arranged are let to be blank. Whereas, in a case that the number of frame images printed in the past is larger than N, N number of frame images are selected from the frame images printed in the past, and contents of the frame images selected are arranged in the form of tiles.

As aforementioned, according to the application 12b of the present embodiment, the thumbnail image 72 which includes frame images printed in the past is displayed on the file selection screen 70. Therefore, it is easy for the user to associate the thumbnail 72 with the content of the moving-image file that has been associated with the thumbnail image 72. Therefore, the user is able to select easily a desired moving-image file from the plurality of moving-image files.

Particularly, with respect to a moving-image file for which a plurality of frame images has been printed in the past, one thumbnail 72b including the contents of at the most N number of frame images is displayed, and the contents of the N number of frame images is arranged in the form of tiles. Since the user is able to view the contents of the plurality of frame images at a time by one thumbnail image, it is easy to remember the contents of the moving-image file corresponding to that thumbnail image.

Figure 3A:
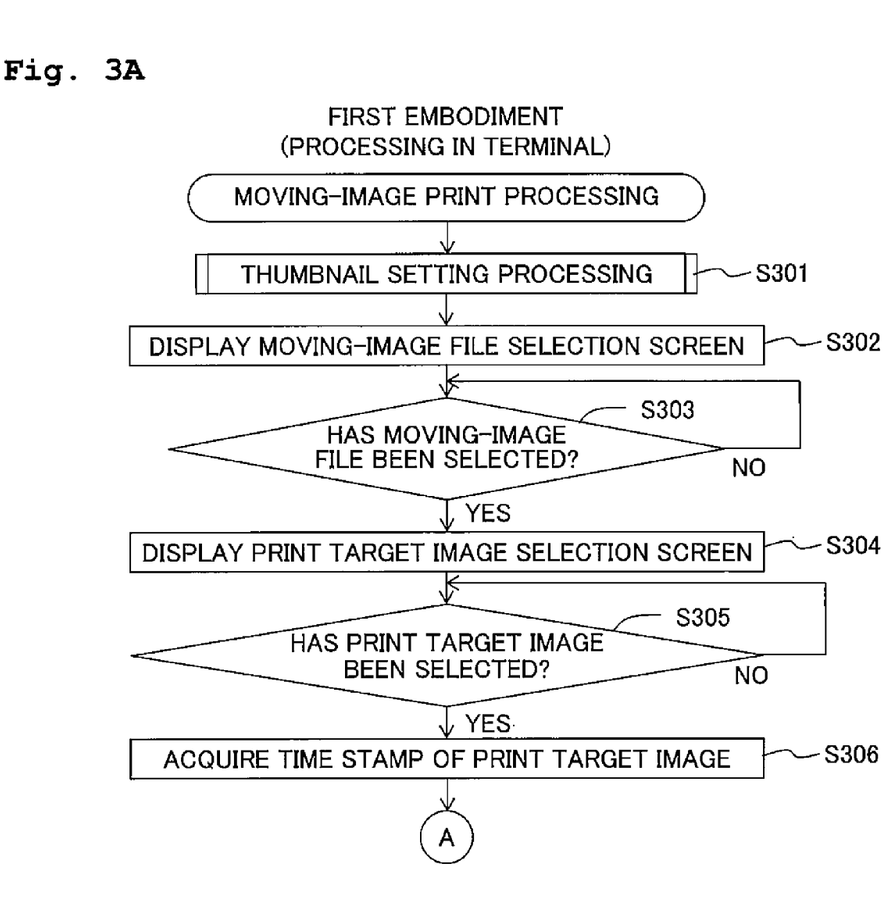
FIG. 3A and FIG. 3B show a flowchart showing a moving-image print processing.
Figure 3B:
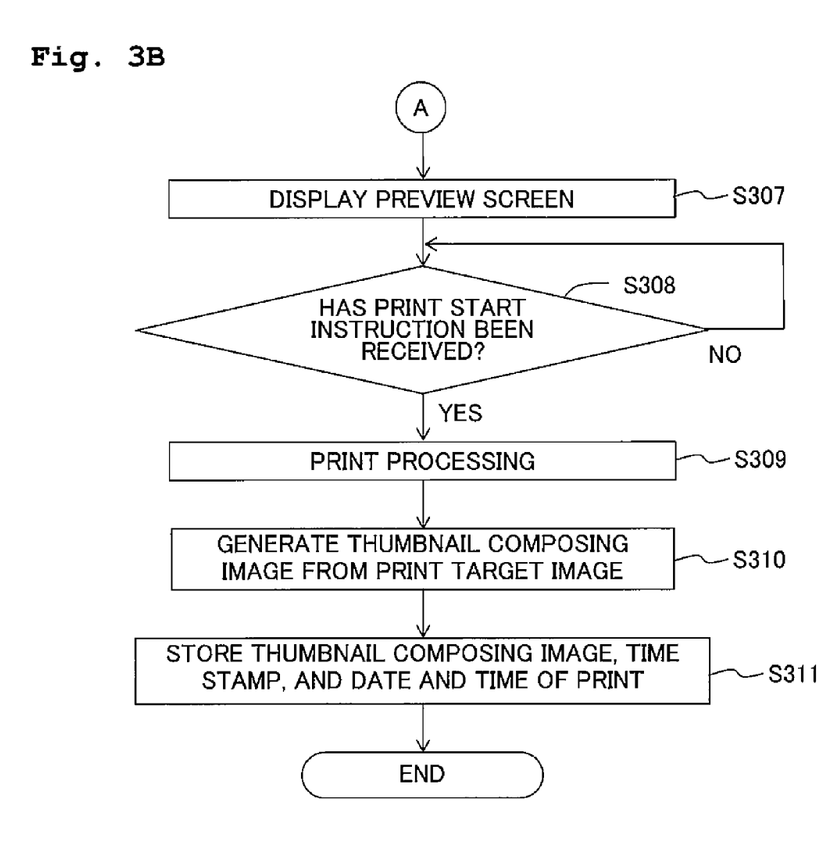

FIGS. 3A and 3B show a flowchart of a moving-image print processing. The moving-image print processing starts when the "moving-image print" is selected in the menu screen (not shown in the diagram). The CPU 11 executes a thumbnail setting processing (step S301). The thumbnail setting processing (step S301) is a processing of setting the thumbnail image 72 to be displayed on the file selection screen 70 in FIG. 2A. The thumbnail setting processing will be described later by referring to FIG. 4A.

The CPU 11 displays the file selection screen 70 on the LCD 16 (step S302). At step S302, the CPU 11 displays the thumbnail image 72 that has been set in the thumbnail setting processing (S301), together with the pass 71 which indicates a destination to store the moving-image file corresponding to that thumbnail image 72. The CPU 11 waits for a moving-image file to be selected via the file selection screen 70 (No at step S303).

When the CPU 11 has received the selection of the moving-image file (Yes at step S303), the CPU 11 displays on the LCD 16 a print target frame image (hereinafter referred to as "print target image") selection screen (not shown in the diagram) for selecting one print target image included in frame images which form the moving-image file that has been selected (step S304). On the print target image selection screen, the user can replay the moving-image file, and can also specify a frame image at an arbitrary timing while the moving-image file is being replayed. The frame image that has been specified is selected as the print target image.

The CPU 11 waits for the print target image to be selected, via the print target image selection screen (No at step S305). In a case that the selection of the print target image has been received (Yes at step S305), the CPU 11 acquires a time stamp of the frame image that has been selected as the print target image, from the moving-image file which was selected at step S303 (step S306). The CPU 11 creates a preview image from the frame image that has been selected as the print target image. Thereafter, the CPU 11 displays on the LCD 16, a preview screen (not shown in the diagram) in which the preview image has been displayed (step S307).

The preview screen includes a print button, and the CPU 11 receives an operation of the print button as a print-start instruction. The CPU 11 waits for the print-start instruction (No at step S308). In a case that the CPU 11 has received the print-start instruction (Yes at step S308), the CPU 11 executes the print processing of printing the print target image by the MFP 100 (step S309). Concretely, in the print processing (step S309), the CPU 11 transmits image data and print settings of the print target image to the MFP 100 by Wi-Fi communication via the AP 50. Data for print created from the image data and print settings of the print target image may be transmitted to the MFP 100.

In a case that the wireless communication in accordance with the Wi-Fi Direct (registered trademark) standards has been established between the terminal 10 and the MFP 100 with the NFC communication established between the terminal 10 and the MFP 100 as a trigger, the print setting and the image data of the target image may be transmitted to the MFP 100 by the wireless communication established. In this case, by the CPU 11 receiving an event indicating that a communication counterpart for the NFC communication has been detected, from the OS 12a, the CPU 11 makes a judgment that a print-start instruction has been received.

The CPU 11 creates a thumbnail composing image from the print target image (step S310). The thumbnail composing image is an image which is included in the thumbnail image 72 to be displayed on the file selection screen. In the present embodiment, the thumbnail composing image created at step S310 is a reduced image in which a frame image of the print target image is reduced. The thumbnail composing image, according to a size of the frame image, may be the frame image, or may be an enlarged image in which the frame image is enlarged.

The CPU 11, after the processing at step S310, stores upon associating the thumbnail composing image created, the time stamp, and date and time of print that has been acquired from a real time clock which is not shown in the diagram, with the moving-image file to be printed, in the application storage area 12c (step S311), and terminates the processing.

Figure 4A:
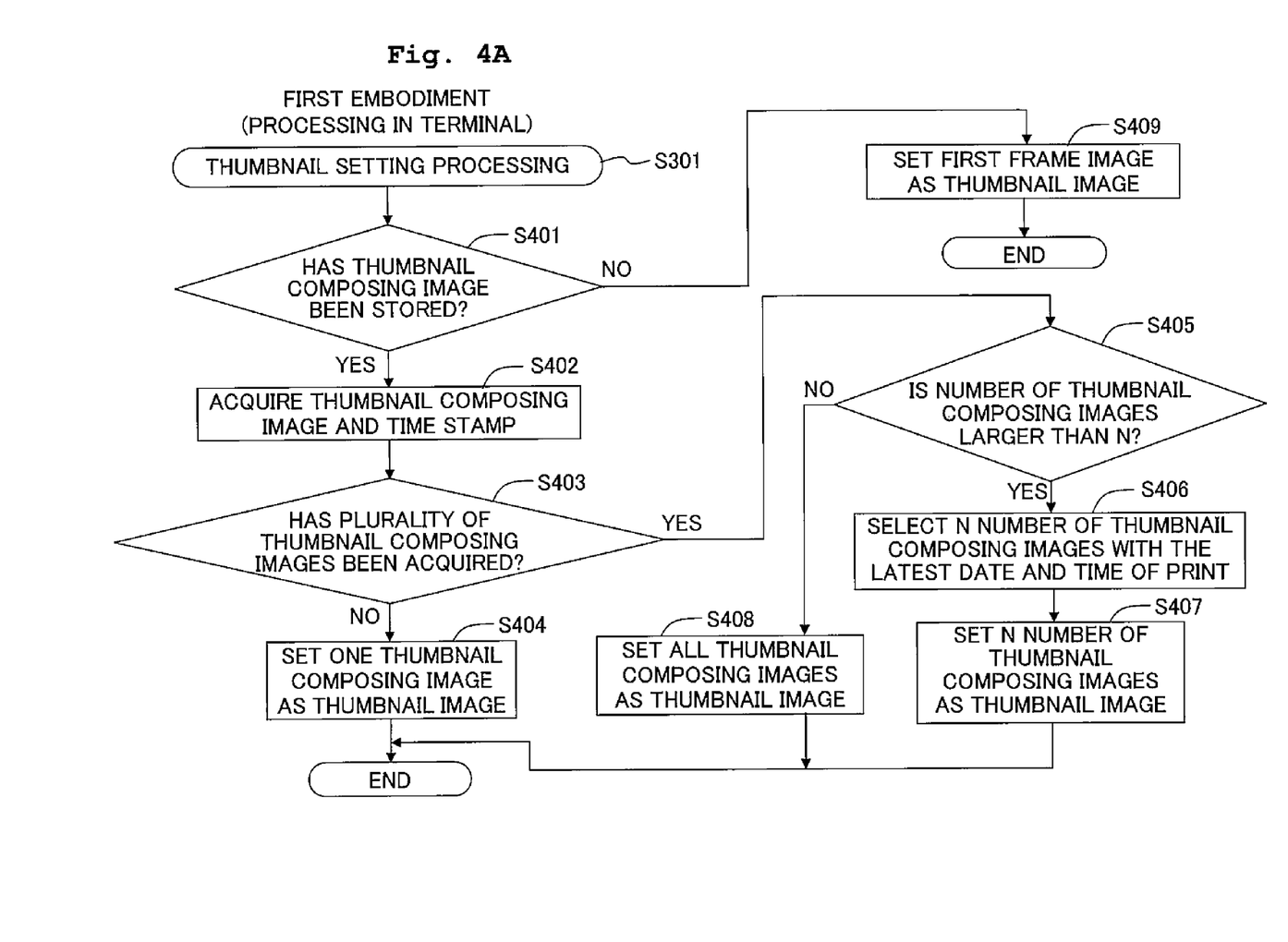
FIG. 4A is a flowchart showing a thumbnail setting processing and FIG. 4B is a flowchart showing a thumbnail display processing respectively.

FIG. 4A is a flowchart showing the abovementioned thumbnail setting processing (step S301). The thumbnail setting processing is executed for each of the moving-image files that are to be displayed on the file selection screen 70. The CPU 11, for the moving-image file, makes a judgment of whether or not the thumbnail composing image has been stored in the application storage area 12c (step S401).

In a case that a judgment that the thumbnail composing image has not been stored in the application storage area 12c is made, or in other words, in a case that moving-image print of the moving-image file has not been carried out even once (No at step S401), the CPU 11 sets an image of a first frame from among the plurality of frame images forming that moving-image file, as a thumbnail image (step S409), and terminates the present processing.

Whereas, in a case that a judgment that the thumbnail composing image has been stored in the application storage area 12c is made (Yes at step S401), the CPU 11 acquires all the thumbnail composing images of that moving-image file, and time stamps corresponding to all the thumbnail composing image respectively (step S402).

The CPU 11 makes a judgment of whether the plurality of thumbnail composing images has been acquired at step S402 (step S403). In a case that the CPU 11 has made a judgment that one thumbnail composing image was acquired, or in other words, in a case that only one frame image has been printed in the past (No at step S403), the CPU 11 sets that one thumbnail composing image as a thumbnail image (step S404), and terminates the processing.

In a case that a judgment that a plurality of thumbnail images has been acquired is made at step S403 (Yes at step S403), the CPU 11 makes a judgment of whether the number of thumbnail composing images is larger than the maximum number N which has been determined in advance (step S405). In the present embodiment, N=9. In a case that a judgment that the number of thumbnail composing images is not larger than N is made (No at step S405), the CPU 11 sets all the thumbnail composing images as a thumbnail image (step S408), and terminates the processing.

In a case that at step S405, a judgment that the number of thumbnail composing images is larger than N is made (Yes at step S405), the CPU 11 selects N number of thumbnail composing images having a new date and time of print, from among all the thumbnail composing images (step S406). In other words, the CPU 11 excludes (eliminates) the thumbnail composing images with old date and time of print, from among all the thumbnail composing images in the moving-image file which is to be subjected to the thumbnail setting processing, and selects N number of thumbnail composing images having new date and time of print. The CPU 11 sets the N number of thumbnail composing images that have been selected, as the thumbnail images (step S407), and terminates the processing.

According to the abovementioned thumbnail setting processing (S301), for the moving-image file of which only one frame image has been printed in the past, or for the moving-image file of which no moving-image has been printed in the past, one frame image is set as the thumbnail image. Whereas, for the moving-image file of which the plurality of frame images has been printed in the past, maximum of N number of thumbnail composing images are set as the thumbnail images.

Even in a case that a plurality of thumbnail composing images has been stored, or in other words, in a case that the plurality of frame images has been printed in the past, since the number of frame images that can be set as the thumbnail images is restricted to N, it is possible to suppress the number of images displayed as the thumbnail composing images from being excessive. Particularly, in a case that the number of thumbnail composing images is larger than N, a thumbnail composing image corresponding to a frame image for which the date and time of print is new (the latest) is set as the thumbnail image. Therefore, it is easy for the user to remember the contents of the moving-image file corresponding to that thumbnail image, from the thumbnail images. Therefore, the user is capable of selecting easily a desired moving-image file from among the plurality of moving-image files.

Figure 4B:
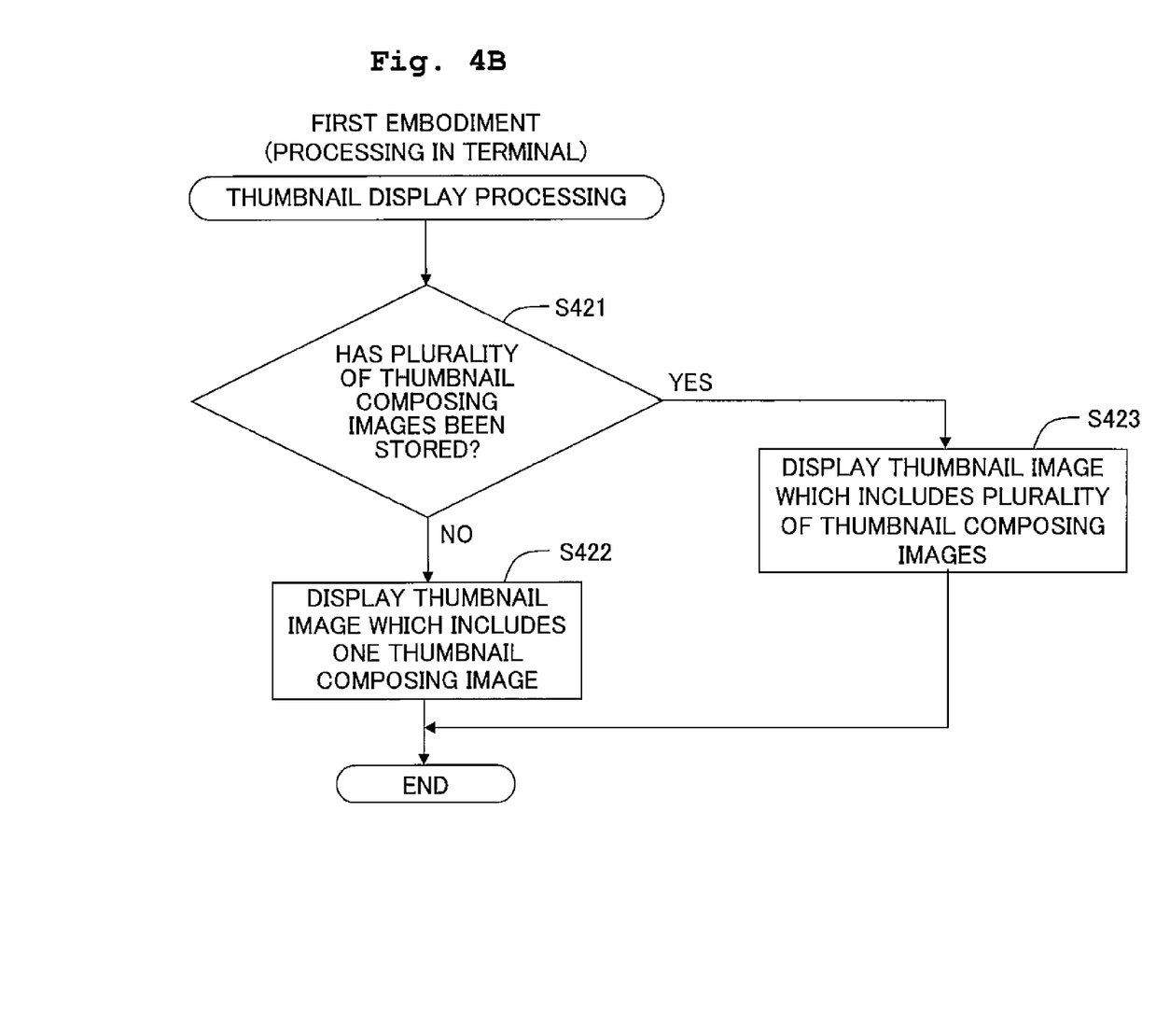

FIG. 4B is a flowchart showing a thumbnail display processing. The thumbnail display processing is a processing of displaying on the file selection screen 70, the thumbnail image that has been set in the abovementioned thumbnail setting processing (step S301). The thumbnail display processing is carried out occasionally (whenever necessary) at a timing at which a thumbnail image for the corresponding moving-image file is to be displayed during a time after displaying the file selection screen 70, till receiving a selection of a moving-image file by the CPU 11. As a timing at which the thumbnail image is to be displayed, timings such as a timing at which the file selection screen 70 has been displayed and a timing at which a thumbnail image that has not been displayed till that time is displayed by the file selection screen 70 being scrolled, can be cited.

The CPU 11 makes a judgment of whether the plurality of thumbnail composing images has been set as the thumbnail images (step S421). In a case that the CPU 11 has made a judgment that only one thumbnail composing image has been set as the thumbnail image (No at step S421), the CPU 11 displays that one thumbnail composing image as the thumbnail image 72 on the file selection screen 70 (step S422), and terminates the thumbnail display processing. The thumbnail image 72 is displayed together with the pass 71 indicating the destination to store a moving-file corresponding to that thumbnail image 72. As a result of the processing at step S422, thumbnail images such as the thumbnail images 72a and 72c shown in FIG. 2A are displayed on the file selection screen 70.

Whereas, in a case that the CPU 11 has made a judgment that the plurality of thumbnail composing images has been stored as thumbnail images (Yes at step S421), the CPU 11 displays one thumbnail image which includes the plurality of thumbnail composing images on the file selection screen 70 (step S423), and terminates the processing. One thumbnail image 72 includes the plurality of thumbnail composing images arranged in the form of tiles. As a result of the processing at step S423, a thumbnail image such as the thumbnail image 72b shown in FIG. 2B is displayed on the file selection screen 70.

According to the first embodiment, the content of the frame image that has been printed in the past is included in the thumbnail image 72 for identifying the moving-image file displayed on the file selection screen 70. Therefore, it is easy for the user to associate the thumbnail image 72 with contents of the moving-image. Accordingly, it is possible for the user to select a desired moving-image file from the plurality of moving-image files.

Next, a second embodiment will be described below by referring to FIGS. 5A, 5B, and 5C. In the first embodiment, for the moving-image file which was subjected to moving-image print only once in the past, the thumbnail image 72 which includes the content of one frame image printed, was displayed on the file selection screen 70. In the second embodiment, even when it is a moving-image file which was subjected to moving-image print only once in the past, a thumbnail image which includes contents of the N number of frame images is displayed. In the second embodiment, same reference numerals are assigned to components which are same as in the first embodiment, and the description of such components is omitted. The description will be made below by referring mainly to an arrangement peculiar to the second embodiment.

Figure 5A:
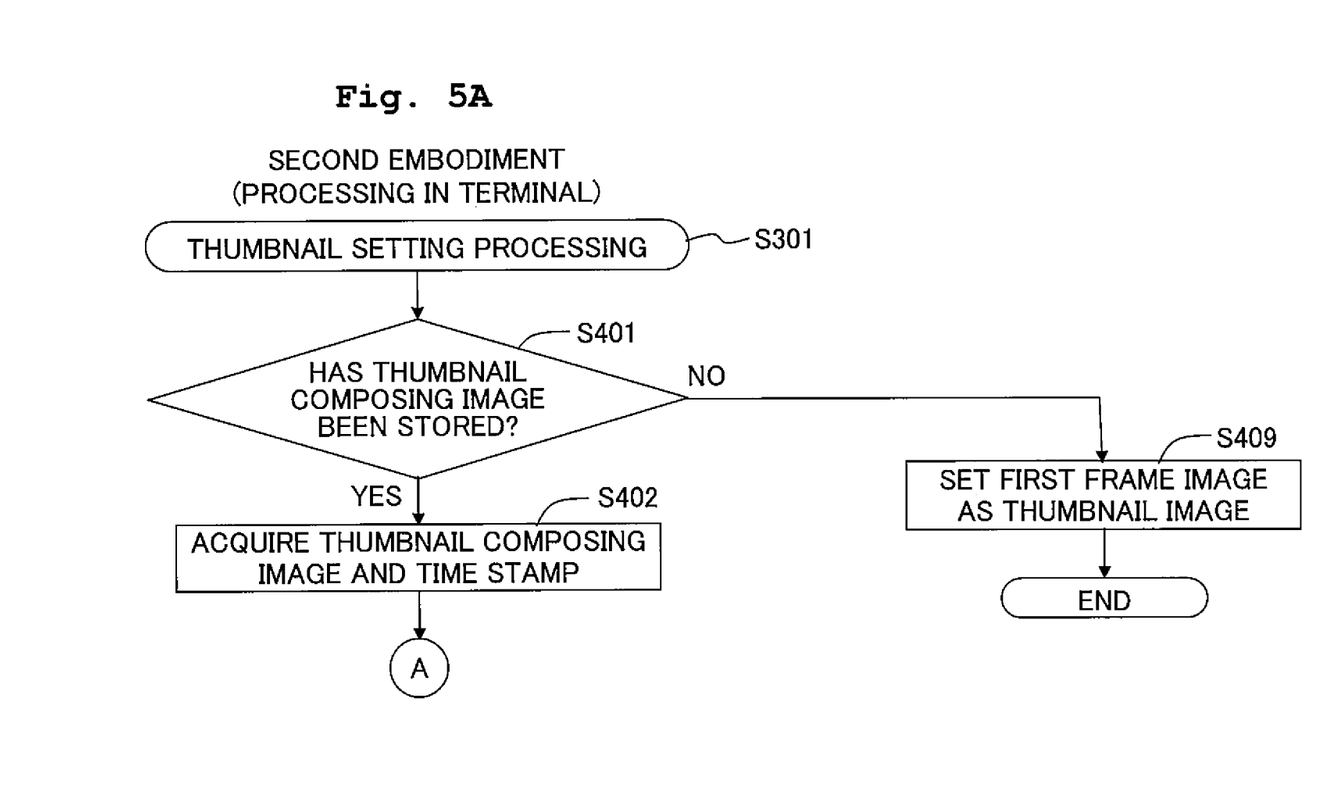
FIGS. 5A and 5B show a flowchart showing a thumbnail setting processing according to a second embodiment.

FIG. 5A is a flowchart showing a thumbnail setting processing (step S301) according to the second embodiment. The thumbnail setting processing is a processing to be executed by the CPU 11 of the terminal 10 according to the application 12b of the second embodiment. In a case that a judgment that one thumbnail composing image has been acquired is made, or in other words, in a case that only one frame image has been printed in the past (No at step S403), the CPU 11 selects N number of frame images including a frame image corresponding to that one thumbnail composing image from among frame images which form a moving-image file, (or in other words, the frame image printed in the past) (step S501).

In the scope of the present patent specification and claims, "previous frame image" refers to a frame image which is included in the plurality of frame images forming the moving-image file, and for which the shooting (photographing) time is earlier than the shooting time for a reference frame image (in other words, a frame image printed in the past). The "previous frame image" includes an adjacent frame image which is adjacent to the reference frame image, or a series of frame images which includes the adjacent frame image.

Whereas, "next frame image" refers to a frame image which is included in the plurality of frames images forming the moving-image file, and for which the shooting time is later than the shooting time for the reference frame image. The "next frame image" includes an adjacent frame image which is adjacent to the reference frame image, or a series of frame images which includes the adjacent frame image.

At step S501, the CPU 11 acquires N number of frame images including a frame image corresponding to the thumbnail composing image, based on the time stamp acquired at step S402. In the present embodiment, N=9. Since a value of N is an odd number, {(N−1)/2} number of frame images are selected from the previous frame images, and {(N−1)/2} number of frame images are selected also from the next frame images.

If N number of frame images including frame images that have been printed in the past are selected, it is not necessary to select such that the number of frame images selected from the previous frame images and the number of frame images selected from the next frame images are same. In a case that the value of N is an even number, since the value of (N−1) becomes an odd number, it is not possible to let the number of frame images selected from the previous frame images and the number of frame images selected from the next frame images to be the same. Therefore, in this case, the number of frame images selected from one of the previous frame images and the next frame images becomes larger than the number of frame images selected from the other (the remaining) of the previous frame images and the next frame images.

Moreover, in a case that N=2, it is preferable to select one frame image either from the previous frame images or from the next frame images. In a case that N≥3, an arrangement may be such that, (N−1) number of frame images may be selected either from the previous frame images or from the next frame images.

A case in which at step S405, the CPU 11 has made a judgment that the number of thumbnail composing images is not larger than N (No at step S405), the CPU 11 selects (N—the number of thumbnail composing images) number of frame images from the frame images that form the moving-image file (step S504). In the second embodiment, (N—the number of thumbnail composing images) number of frame images are selected from the previous frame images and/or the next frame images, letting a frame image corresponding to a thumbnail composing image with the latest date and time of print to be a reference. If the number of frame images selected is (N—the number of thumbnail composing images), it is possible to adopt various methods of selection. For instance, without restricting to one thumbnail composing image with the latest date and time of print as described above, a total of (N—the number of thumbnail composing images) number of frame images may be selected letting two or more than two frame images corresponding to two or more than two thumbnail composing images as references.

The CPU 11, for the frame image selected at step S501 or step S504, creates thumbnail composing images similarly as at the abovementioned step S310 (step S502). As a result of the processing at step S502, the N number of thumbnail composing images is prepared. The CPU 11, after the processing at step S502, sets the N number of thumbnail composing images prepared as the thumbnail images (S503), and terminates the present processing.

According to the abovementioned thumbnail setting processing (S301) according to the second embodiment, irrespective of the number of frame images that were printed in the past, the N number of frame images are set as the thumbnail images.

Figure 5B:
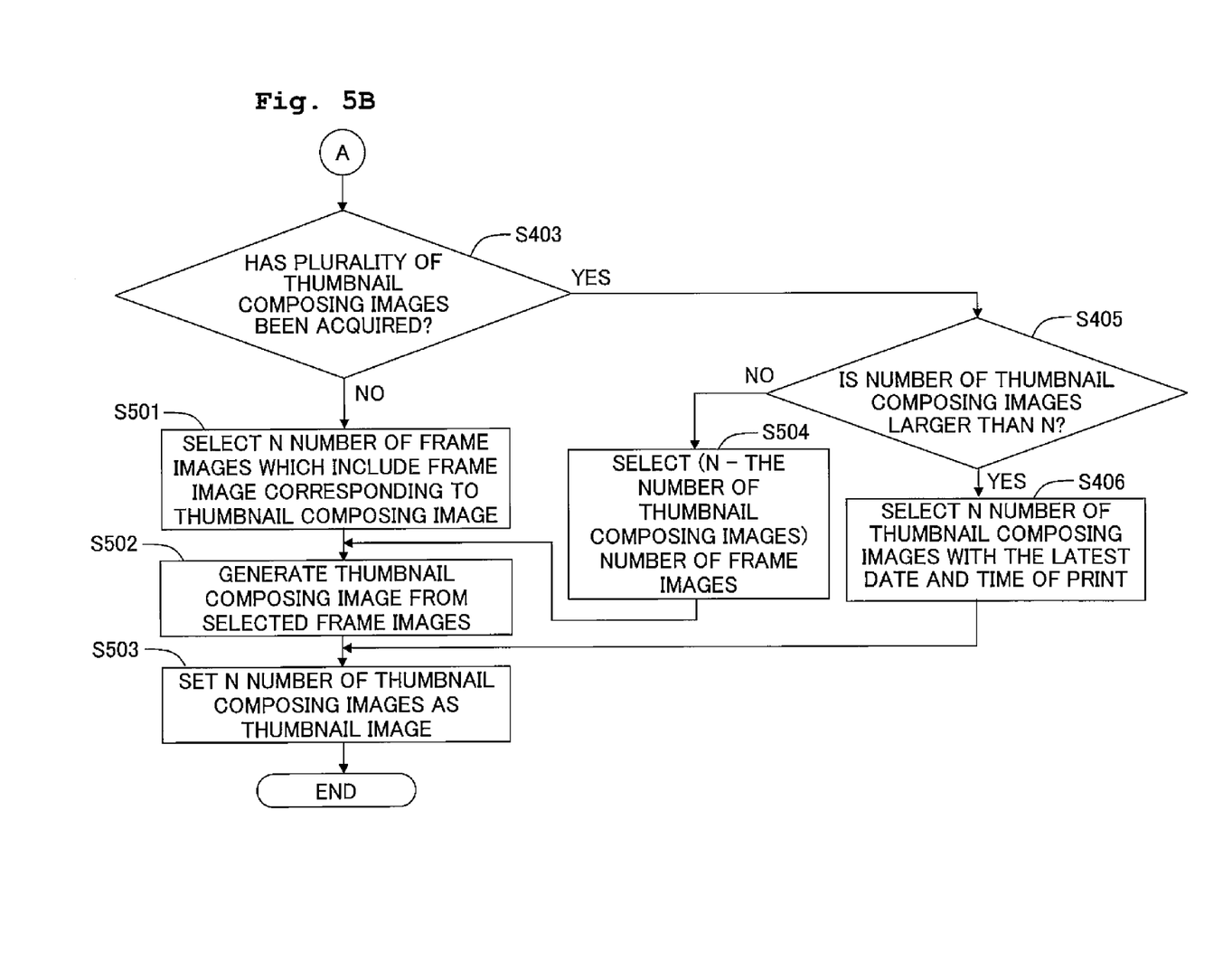
Figure 5C:
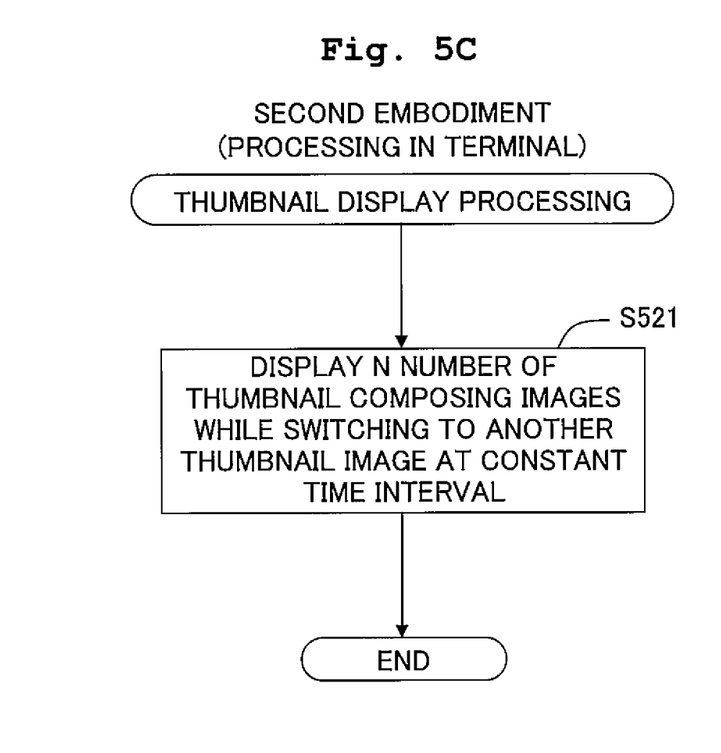
FIG. 5C is a flowchart showing a thumbnail display processing according to the second embodiment.

FIG. 5B is a flowchart showing a thumbnail display processing according to the second embodiment. The thumbnail display processing is a processing executed by the CPU 11 of the terminal 10 according to the application 12b of the second embodiment. The thumbnail display processing is carried out occasionally at a timing at which a thumbnail image corresponding to a moving-image file is to be displayed during the time after displaying the file selection screen 70, till receiving a selection of the moving-image file by the CPU 11.

In the second embodiment, since the number of thumbnail composing images to be set as thumbnails in the thumbnail setting processing (step S301) is N, it is not necessary to make a judgment of whether or not the plurality of thumbnail composing images have been stored, as in the thumbnail display processing (FIG. 4B) according to the first embodiment. Therefore, the CPU 11 displays on the file selection screen 70, the N number of thumbnail composing images one by one upon replacing (switching over) to another thumbnail image at a regular time interval, as the thumbnail image 72 (step S521), and terminates the thumbnail display processing. Similarly as in the first embodiment, the thumbnail image 72 is displayed together with the pass 71 which displays the destination to store the moving-image file corresponding to that thumbnail image 72. As a result of the processing at step S521, the thumbnail image which includes a content of one frame image, such as the thumbnail images 72a and 72c as shown in FIG. 2A for instance, is displayed on the file selection screen, while replacing the contents of the thumbnail image at regular time interval.

An arrangement may be made such that the CUP 11 executes the processing at the abovementioned step S423 instead of the processing at step S521. In other words, as shown in FIG. 2B, one thumbnail image 72 including the N number of thumbnail composing images that are arranged in the form of tiles may be displayed.

According to the second embodiment, in a case that the number of thumbnail composing images is less than N, or in other words, in a case that the number of frame images that were printed in the past is less than N, by using also the frame images which have not yet been printed, the N number of thumbnail composing images are set as the thumbnail images. Therefore, the user is capable of identifying easily a desired moving-image file by the thumbnail images.

Particularly, even if the number of thumbnail composing images is less than N, since a total of N number of thumbnail composing images are set as the thumbnail images, the user is able to identify a desired moving-image file favorably.

In the abovementioned embodiment, the application 12b is an example of an information processing program (instruction). The terminal 10 is an example of an information processing apparatus. The CPU 11 is an example of a controller. The LCD 16 is an example of a display unit. The memory card MC is an example of a storage unit. The printer unit 131 of the MFP 100 is an example of a printing unit. The file selection screen 70 is an example of a selection screen. The thumbnail images 72a, 72b, and 72c are examples of a thumbnail image.

The present invention has been described heretofore based on the embodiments. However, the present invention is not restricted to the embodiments described heretofore, and various improvements and modifications are possible without departing from the scope of the present invention.

For example, in the embodiments described above, the terminal 10 such as a smartphone has been exemplified as an information processing apparatus having the application 12b loaded therein. However, it is possible to use an apparatus such as a tablet terminal, a personal computer, and a digital camera as an information processing apparatus for loading the application 12b.

In the embodiments described above, a case in which the application 12b which is an information processing program of the present invention is loaded in the terminal 10 not having a printing unit has been exemplified. However, the information processing program of the present invention may be loaded in an information processing apparatus which has a printing unit. In other words, a computer program corresponding to the application 12b may be loaded in the MFP 100 having the printer unit 131 for instance, and not the terminal 10. In a case of this modified example, the MFP 100 corresponds to the "information processing apparatus", and the printer unit 131 corresponds to the "printing unit that is to be connected to the information processing apparatus". The information processing apparatus having the printing unit, without restricting to the abovementioned MFP 100, may be a printer having only a print function.

In the embodiments described above, although the OS 12a of the terminal was the Android OS, another OS may be used.

In the file selection screen 70 shown in FIG. 2A of the embodiments described above, a set including the pass 71 indicating a location of storage of that moving-image file and the thumbnail image 72 corresponding to that moving-image file is to be displayed for each moving-image file which may be printed. However, only the thumbnail image 72 may be displayed.

In the file selection screen 70 shown in FIG. 2A of the embodiments described above, the thumbnail images 72a and 72c including the contents of one frame image, and the thumbnail image 72b including the contents of maximum N number of frame images were displayed with the same size in the diagram. However, the size of the thumbnail image 72b may be made larger than the size of the thumbnail images 72a and 72c. For the thumbnail image 72b, since the plurality of frame images is included in one thumbnail image, by making the display size of the thumbnail image 72 large, each user is able to view easily the content of each of the frame images.

Or, in a case that a thumbnail image 72b including the contents of maximum of N number of frame images is included in the thumbnail images 72 displayed on the file selection screen 70, the size of all the thumbnail images 72, including the thumbnail images 72a and 72c which include the content of one frame image, may be made large.

In FIG. 2A and FIG. 2B of the embodiments described above, the thumbnail image 72b made of maximum of nine thumbnail composing images arranged in the form of tiles arranged in 3×3 was exemplified. However, the arrangement of the plurality of thumbnail composing images included in one thumbnail image 72 is not restricted to the arrangement in the form of tiles, and various arrangements can be adopted.

In FIG. 2B of the embodiments described above, in a case that the number of frame images that have been printed in the past is smaller than N, the area A in which the thumbnail composing image is not to be arranged, was blank. Instead, in a case that the number of frame images that have been printed in the past is smaller than N, the arrangement may be changed according to the number of frame images. For instance, in a case that the frame images that have been printed in the past is four, a thumbnail image 72 which includes four thumbnail composing images arranged in the form of tiles arranged in 2×2, may be displayed on the file selection screen 70.

In the first embodiment, in a case that the number of thumbnail composing images is larger than N, out of all the thumbnail composing images, N number of thumbnail composing images were set as the thumbnail images. However, all the thumbnail composing images may be set as the thumbnail images.

In the second embodiment, irrespective of the number of thumbnail composing images, the N number of thumbnail composing images were set as the thumbnail images. However, the number of thumbnail composing images to be set as the thumbnail images may vary according to whether the number of thumbnail composing images is one or not less than two.

According to the thumbnail setting processing (FIG. 5A) of the second embodiment, at steps S501 and S504, a series of frame images adjacent to the reference frame image was selected from the previous frame images and/or next frame images. However, the frame image which is adjacent to the reference frame image may not be selected. Moreover, not plurality of consecutive frame images, but frame images which are not consecutive, such as alternate frame images, may be selected.

In the embodiments described above, in a case that the number of thumbnail composing images is larger than N, out of the all thumbnail composing images, N number of thumbnail composing images with the latest date and time of print were selected. However, without restricting to the date and time of print as a condition for selection, the thumbnail composing images may be selected according to another condition. For example, in a case that a frame image has been printed, the number of times for which the frame image has been printed may be stored in the application storage area 12c, and N number of thumbnail composing images may be selected in order from a thumbnail composing image having the largest number of printing. Moreover, the N number of thumbnail composing images may be selected according to a plurality of conditions. For example, a frame image having the largest number of printing may be selected on priority basis, and frame images having the number of printing not larger than the predetermined number of times may be selected in descending order of the date and time.

In the embodiments described above, the file selection screen 70 for selecting a moving-image which is a print target has been exemplified as a screen on which the thumbnail image created from a frame image for which the printing was carried out in the past, is displayed. However, it is not restricted to the file selection screen for selecting a moving-image file to be printed. The present invention is applicable to any file selection screen irrespective of a purpose of use of a moving-image file, provided that it is a file selection screen for selecting a moving-image file. For example, a thumbnail image created from a frame image that was printed in the past may be displayed on the file selection screen for selecting a moving-image file which is to be viewed. Even in this case, the user is capable of selecting easily a moving-image file to be viewed, from among the plurality of moving-image files, similarly as in the embodiments described above.

In the embodiments described above, the CPU 11 executed each processing described in FIGS. 3A to 5C. However, a plurality of CPUs may execute in combination each processing shown in FIGS. 3A to 5C. Moreover, an IC (integrated circuit) such as an ASIC (application specific integrated circuit) may execute independently or in combination each processing shown in FIGS. 3A to 5C. Moreover, the CPU 11 and an IC such as an ASIC may execute in combination each processing shown in FIGS. 3A to 5C.

Characteristics of the embodiments described above, and characteristics of the abovementioned modified examples may be executed in combination appropriately. For example, the processing at step S521 in the thumbnail display processing (FIG. 5C) according to the second embodiment may be executed instead of the processing at step S423 in the thumbnail display processing (FIG. 4B) according to the first embodiment. Moreover, in the embodiments described above, the thumbnail setting processing (step S301) was executed in the moving-image print processing (FIG. 3). However, the thumbnail setting processing may be executed before step S421 or step S522 in the thumbnail display processing (FIG. 4B or FIG. 5C).

What is claimed is:

1. A non-transitory computer-readable medium storing computer-executable instructions that, when executed by a processor, cause a controller of an information processing apparatus provided with a display unit and the controller, and connected with a storage unit and a print unit, to perform:
  receiving a selection of a moving-image file from a plurality of moving-image files which has been stored in the storage unit;
  receiving a selection of a print target frame image from a plurality of frame images composing the moving-image file that has been selected;
  outputting print data of the print target frame image to the print unit;
  storing a thumbnail composing image in the storage unit upon associating with the moving-image file that has been selected, the thumbnail composing image being one of the print target frame image, a reduced image of the print target frame image, and an enlarged image of the print target frame image; and
  displaying, on the display unit, one thumbnail image based on the thumbnail composing image that has been associated with the moving-image file and stored in the storage unit, for each of the plurality of moving-image files that has been stored in the storage unit.

2. The medium according to claim 1, wherein the instructions cause the controller to perform displaying, on the display unit, a plurality of images including the thumbnail composing image, as the one thumbnail image.

3. The medium according to claim 2, wherein the instructions cause the controller to perform displaying, on the display unit, the plurality of images one by one by switching the plurality of images, as the one thumbnail image.

4. The medium according to claim 2, wherein the instructions cause the controller to perform displaying, on the display unit, an image which has a plurality of divided areas and in which the plurality of images is arranged in the plurality of divided areas respectively, as the one thumbnail image.

5. The medium according to claim 2,
  wherein the plurality of images further includes at least one of a previous frame image of the print target frame image, a next frame image of the print target frame image, a reduced image of the previous frame image, an enlarged image of the previous frame image, a reduced image of the next frame image, and an enlarged image of the next frame image, and
  the previous frame image and the next frame image are included in the plurality of frame images composing the moving-image file that has been selected.

6. The medium according to claim 2, wherein the instructions cause the controller to further perform:
  for each of the plurality of moving-image files that has been stored in the storage unit,
    judging the number of thumbnail composing images stored in the storing unit; and
    in a case of judging that the number of thumbnail composing images stored in the storing unit is one, setting the one thumbnail composing image, and one of a previous frame image of a reference frame image which corresponds to the one thumbnail composing image, a next frame image of the reference frame image, a reduced image of the previous frame image, an enlarged image of the previous frame image, a reduced image of the next frame image, and an enlarged image of the next frame image, as the plurality of images.

7. The medium according to claim 2, wherein the instructions cause the controller to further perform:
  for each of the plurality of moving-image files that has been stored in the storage unit,
    judging the number of thumbnail composing images stored in the storing unit; and
    in a case of judging that a plurality of thumbnail composing images is stored in the storing unit, setting the plurality of thumbnail composing images as the plurality of images.

8. The medium according to claim 7, wherein the instructions cause the controller to further perform:
  for each of the plurality of moving-image files that has been stored in the storage unit,
    in a case of judging that the plurality of thumbnail composing images is stored in the storing unit, judging whether the number of the plurality of thumbnail composing images exceeds a maximum settable number of the plurality of images; and
    in a case of judging that the number of the plurality of thumbnail composing images exceeds the maximum settable number, selecting the maximum settable number of thumbnail composing images from the plurality of thumbnail composing images and setting the selected thumbnail composing images as the plurality of images.

9. The medium according to claim 8,
  wherein the instructions cause the controller to perform storing the thumbnail composing image upon associating with an output time, at which the print data of the print target frame image corresponding to the thumbnail composing image is outputted to the print unit, and
  the instructions cause the controller to perform selecting the maximum settable number of thumbnail composing images from the plurality of thumbnail composing images in descending order of the output time.

10. The medium according to claim 7, wherein the instructions cause the controller to further perform:
  for each of the plurality of moving-image files that has been stored in the storage unit,
    in a case of judging that the plurality of thumbnail composing images is stored in the storing unit, judging whether the number of the plurality of thumbnail composing images exceeds a maximum settable number of the plurality of images; and
    in a case of judging that the number of the plurality of thumbnail composing images does not exceed the maximum settable number, selecting the plurality of thumbnail composing images and at least one of a previous frame image of a reference frame image which corresponds to one of the plurality of thumbnail composing images, a next frame image of the reference frame image, a reduced image of the previous frame image, an enlarged image of the previous frame image, a reduced image of the next frame image, and an enlarged image of the next frame image, so that the maximum settable number of images are selected, and setting the selected maximum settable number of images as the plurality of images.

11. An information processing apparatus connected to a storage unit and a print unit, the apparatus comprising:
  a display unit; and
  a controller configured to:
    receive a selection of a moving-image file from a plurality of moving-image files which has been stored in the storage unit;
    receive a selection of a print target frame image from a plurality of frame images composing the moving-image file that has been selected;

output print data of the print target frame image to the print unit;

store, a thumbnail composing image in the storage unit upon associating with the moving-image file that has been selected, the thumbnail composing image being one of the print target frame image, a reduced image of the print target frame image, and an enlarged image of the print target frame image; and display, on the display unit, one thumbnail image based on the thumbnail composing image that has been associated with the moving-image file and stored in the storage unit, for each of the plurality of moving-image files that has been stored in the storage unit.

12. The information processing apparatus according to claim 11, wherein the controller is configured to display, on the display unit, a plurality of images including the thumbnail composing image, as the one thumbnail image.

13. The information processing apparatus according to claim 12, wherein the controller is configured to display, on the display unit, the plurality of images one by one by switching the plurality of images, as the one thumbnail image.

14. The information processing apparatus according to claim 12, wherein the controller is configured to display, on the display unit, an image which has a plurality of divided areas and in which the plurality of images is arranged in the plurality of divided areas respectively, as the one thumbnail image.

15. The information processing apparatus according to claim 12, wherein the controller is further configured to:
for each of the plurality of moving-image files that has been stored in the storage unit,
judge the number of thumbnail composing images stored in the storing unit; and
in a case of judging that a plurality of thumbnail composing images is stored in the storing unit, set the plurality of thumbnail composing images as the plurality of images.

16. An information processing method to be executed by an information processing apparatus that is provided with a display unit and a controller and connected with a storage unit and a print unit, the information processing method comprising:

receiving a selection of a moving-image file from a plurality of moving-image files which has been stored in the storage unit;

receiving a selection of a print target frame image from a plurality of frame images composing the moving-image file that has been selected;

outputting print data of the print target frame image to the print unit;

storing a thumbnail composing image in the storage unit upon associating with the moving-image file that has been selected, the thumbnail composing image being one of the print target frame image, a reduced image of the print target frame image, and an enlarged image of the print target frame image; and displaying, on the display unit, one thumbnail image based on the thumbnail composing image that has been associated with the moving-image file and stored in the storage unit, for each of the plurality of moving-image files that has been stored in the storage unit.

17. The method according to claim 16, wherein a plurality of images including the thumbnail composing image is displayed on the display unit as the one thumbnail image.

18. The method according to claim 17, wherein the plurality of images is displayed on the display unit one by one by switching the plurality of images, as the one thumbnail image.

19. The method according to claim 17, wherein an image which has a plurality of divided areas and in which the plurality of images is arranged in the plurality of divided areas respectively is displayed on the display unit, as the one thumbnail image.

20. The method according to claim 17, wherein the method further comprising:
for each of the plurality of moving-image files that has been stored in the storage unit,
judging the number of thumbnail composing images stored in the storing unit; and
in a case of judging that a plurality of thumbnail composing images is stored in the storing unit, setting the plurality of thumbnail composing images as the plurality of images.

* * * * *